United States Patent
Zak et al.

(10) Patent No.: US 9,610,821 B2
(45) Date of Patent: Apr. 4, 2017

(54) TWIST BEAM AXLE

(71) Applicant: COSMA ENGINEERING EUROPE AG, Oberwaltersdorf (AT)

(72) Inventors: Alexander Zak, Troy, MI (US); Rainer Lottes, Vienna (AT); Stephan Franschitz, Leopoldsdorf (AT); Hannes Halbauer, Theresienfeld (AT)

(73) Assignee: Cosma Engineering Europe AG (AT)

( * ) Notice: Subject to any disclaimer, the term of this patent is extended or adjusted under 35 U.S.C. 154(b) by 0 days.

(21) Appl. No.: 14/783,020

(22) PCT Filed: Apr. 28, 2014

(86) PCT No.: PCT/EP2014/001127
§ 371 (c)(1),
(2) Date: Oct. 7, 2015

(87) PCT Pub. No.: WO2014/177266
PCT Pub. Date: Nov. 6, 2014

(65) Prior Publication Data
US 2016/0046169 A1     Feb. 18, 2016

(30) Foreign Application Priority Data
Apr. 30, 2013 (DE) .................... 20 2013 004 035 U (51) Int. Cl.
*B60G 21/055* (2006.01)
*B60G 21/05* (2006.01)
*F16F 1/366* (2006.01)

(52) U.S. Cl.
CPC ......... *B60G 21/051* (2013.01); *B60G 21/055* (2013.01); *F16F 1/366* (2013.01);
(Continued)

(58) Field of Classification Search
CPC B60G 21/051; B60G 21/055; B60G 2206/20; B60G 2200/21; B60G 2204/1226;
(Continued)

(56) References Cited

U.S. PATENT DOCUMENTS 4,138,141 A * 2/1979 Andersen ............. B60G 21/055
267/273
4,693,140 A * 9/1987 Stephan ................ B29C 53/585
74/579 R
(Continued)

FOREIGN PATENT DOCUMENTS

DE        60222494 T2    6/2008
DE   102011103847 A1   12/2011
(Continued)

*Primary Examiner* — Drew Brown
(74) *Attorney, Agent, or Firm* — Dickinson Wright PLLC (57) ABSTRACT

An assembly (100) for a vehicle includes two longitudinal members (1, 2) and a crossmember (3) connected therebetween at a connection point (6) of the crossmember (3) to the longitudinal members (1, 2). The crossmember (3) is made predominantly of fiber composite material and the longitudinal members (1, 2) are made predominantly of a metal material. The connection point (6) between the crossmember (3) and the longitudinal member (1, 2) comprises an overlapping region (B), in which a connection segment (8) of the longitudinal member (1, 2), which is predominantly composed of metal material, overlaps at least in some segments with a part of the crossmember (3), which is predominantly composed of fiber composite material.

20 Claims, 8 Drawing Sheets

(52) U.S. Cl.
CPC .. *B60G 2200/21* (2013.01); *B60G 2204/1226* (2013.01); *B60G 2206/20* (2013.01); *B60G 2206/7101* (2013.01); *B60G 2206/7102* (2013.01); *B60G 2206/82* (2013.01); *B60G 2206/8206* (2013.01); *B60G 2206/8207* (2013.01); *B60G 2206/82092* (2013.01)

(58) Field of Classification Search
CPC .. B60G 2206/82092; B60G 2206/7102; B60G 2206/82; B60G 2206/8206; B60G 2206/7101; B60G 2206/8207; F16F 1/366
See application file for complete search history.

(56) References Cited

U.S. PATENT DOCUMENTS

| | | | | |
|---|---|---|---|---|
| 7,028,998 | B2* | 4/2006 | Daily | B60G 21/055 267/148 |
| 7,044,458 | B2* | 5/2006 | Daily | B60G 21/055 267/149 |
| 9,216,627 | B2* | 12/2015 | Begenau | B60G 9/003 |
| 2002/0180173 | A1* | 12/2002 | Daily | B60G 21/055 280/124.166 |
| 2003/0015865 | A1* | 1/2003 | Tomita | B60R 22/24 280/808 |
| 2013/0093156 | A1* | 4/2013 | Buschjohann | B60G 21/051 280/124.128 |
| 2013/0240662 | A1* | 9/2013 | Ito | B60R 22/24 242/615.3 |
| 2014/0306436 | A1* | 10/2014 | Toyama | B60R 22/24 280/801.1 |

FOREIGN PATENT DOCUMENTS

| | | |
|---|---|---|
| DE | 102010035524 A1 | 3/2012 |
| DE | 102010049565 A1 | 4/2012 |
| DE | 102012008995 A1 | 9/2013 |
| DE | 102012017940 A1 | 3/2014 |
| EP | 0839677 A1 | 5/1998 |

* cited by examiner

TWIST BEAM AXLE

CROSS-REFERENCE TO RELATED APPLICATIONS

This U.S. National Stage Patent Application claims the benefit of PCT International Patent Application Serial No. PCT/EP2014/001127 filed Apr. 28, 2014 entitled "Twist Beam Axle," which claims the benefit of DE Patent Application Serial No. 20 2013 004 035.1 filed Apr. 30, 2013, the entire disclosures of the applications being considered part of the disclosure of this application and hereby incorporated by reference.

The invention relates to an assembly for a vehicle according to the preamble of claim 1.

Such assemblies with two longitudinal members and a crossmember arranged therebetween are embodied in automobile engineering as carriers, stabilizers or axles, particularly twist beam axles or the like.

Depending on the rolling movement of the vehicle along the transverse axis of the vehicle, the longitudinal members can be deflected to different degrees relative to each other. The resulting forces are transferred into the crossmember connecting the longitudinal members as torsional force or torque. The crossmember twists or rotates elastically along its longitudinal axis. The crossmember also undergoes an elastic bending deformation. The crossmember couples the deflection movements of the two longitudinal members with each other.

The longitudinal members are generally arranged along the vehicle longitudinal axis on the left and right on the undercarriage of the vehicle. When the vehicle moves along its vertical axis, that is, during compression and rebounding of the vehicle, the longitudinal members are loaded and deflected upward and downward along the vertical axis of the vehicle.

While an approximately uniform compression and rebounding of the left and right wheels of an axle is not critical for the driving dynamics, changes in wheel geometry occur when different deflections of the longitudinal members occur on the left and right side that lead to an undesirable self-steering behavior, such as an under- or oversteering of the vehicle, for example.

In order to minimize such undesirable behavior of a vehicle, the torsionable crossmember couples the two longitudinal members, whereby uneven deflections of the longitudinal members can be stabilized. Such a coupling of the left- and right-side longitudinal members leads, particularly when driving on curves, to a lesser rolling movement and thus to improved directional stability of the vehicle. Just such a coupling of the longitudinal members is also advantageous in the stabilizers, carriers or the like mentioned at the outset.

Such crossmembers are generally manufactured as deep-drawn profiles or as full pipes of body panel or, for weight optimization, of aluminum. Light construction and weight optimization are important structural requirements in today's automotive engineering, particularly with respect to emissions reduction. Moreover, the durability of a component is important. Particularly the components mounted on the vehicle undercarriage, such as suspension arms, carriers, stabilizers or the like, for example, are exposed to especially strong weathering influences, which is why more corrosion occurs there.

DE10 2010 036 949 A1 proposes a light and corrosion-resistant crossmember that is part of a twist beam axle. The crossmember can be made of a fiber composite material. Depending on the position of the fibers in relation to the vehicle longitudinal axis, the crossmember has a different torsional and bending deformation under different deflection of the longitudinal members.

DE 10 2011 005 564 A1 discloses a vehicle axle support with receptacles for wheel-guiding suspension arms that are attached to the longitudinal members. The crossmember is made of fiber-reinforced plastic material. To stiffen the axle support, a planar stiffening member of fiber-reinforced plastic material is also provided. DE 39 10641 A1 discloses a stabilizer with a GFC torque tube and two lever arms arranged at its ends. The torque tube has reinforcement in the form of a thicker wall thickness at least in the region of these lever arms.

In the known devices, the problem exists that the joint connection between the crossmembers made of fiber composite material and the metallic longitudinal members is insufficient to transfer the torque introduced at the joint to the crossmember without losses. What is more, breakage of the less stable fiber composite material frequently occurs in the region of the joint despite reinforcements, which is associated with safety-relevant risks in the area of automotive engineering.

It is the object of the present invention to improve an assembly for a vehicle with two longitudinal members made predominantly of a metallic material and a crossmember made predominantly of fiber composite material arranged therebetween that is an elastically torsionable torsion member to the effect that, while the crossmember can easily be connected to the longitudinal member, the forces and moments occurring there can nonetheless be transferred well at the connection point to the crossmember and the connection point simultaneously has a high level of stability.

This object is achieved according to the invention through an assembly with the features of claim 1.

The connection point between the crossmember and the longitudinal member has an overlap region in which a connection segment of the longitudinal member overlaps with a part of the crossmember at least in sections. Such an overlap region creates a large contact surface between the crossmember and the longitudinal members. The entire area of the overlap region can be used here as a connection point between the crossmember and the longitudinal members. There is therefore a sufficiently large area within which desired connection means can be mounted. Such a large surface in the overlap region also has the advantage that the loads, i.e., the forces and moments introduced can be introduced into the crossmember in an especially advantageous manner as to be distributed over the entire surface. The stability of the crossmember, particularly at its ends, with which it is clamped and supported in the longitudinal members, is thus advantageously increased. Moreover, depending on the size of the overlap region, a force or a moment can be introduced in an especially uniform manner into the crossmember, which leads to a uniform force progression. Moreover, certain points on the crossmember can be selected based on the positioning of the overlap region that can absorb the transferred forces and moments especially well.

It is conceivable for the connection segment of the predominantly metallic material-containing longitudinal member either within or outside of the predominantly fiber composite material-containing crossmember to be arranged in the overlap region of the connection point. In the case of an arrangement within, the connection segment can easily be arranged on the interior of the crossmember independently of its exterior shape. At the same time, the connection segment of the predominantly metallic material-containing longitudinal member is protected from corrosion on the interior of the predominantly fiber composite material-containing crossmember. In contrast, an arrangement of the connection segment outside of the crossmember is advantageous, since it can simply be mounted on the crossmember from the outside. Moreover, this external arrangement can protect the fiber composite material of the crossmember from road stone or similar undesired force effects.

It is conceivable for the connection segment of the predominantly metallic material-containing longitudinal member to be arranged both partially within and also partially outside of the predominantly fiber composite material-containing crossmember in the overlap region of the connection point. As a result, one is as independent as possible of the outer and/or the inner contours or shapes of the crossmember during the construction of the connection point between the crossmember and the longitudinal members. Moreover, connection segments that are arranged in the overlap region both inside and outside of the crossmember offer a commensurately larger contact surface between the crossmember and the connection segment of the longitudinal member in comparison so a connection segment that is arranged only inside or outside of the crossmember.

For example, the connection segment can be a component that is integrally formed with the longitudinal member or a component that is separate from the longitudinal member and connectable thereto. An integrally formed component is especially stable and offers a good force progression. In contrast, a component that is separate from and connectable to the longitudinal member is simple to manufacture and can easily be switched or changed out as needed. It is possible for the connection point between the crossmember and the longitudinal member to have at least one form-fitting and/or force-fitting and/or integral connection. Depending on the forces and moments occurring at the connection point, the respective connection types can be used individually or in combination, with single connection types being cost-effective to manufacture, and combined connection types providing an advantageous and good connection between the crossmember and the longitudinal members. It is conceivable for the crossmember to be connected to the connection segment of the longitudinal member by means of a temperature-controlled joining method. For example, upon heating of the connection point, an expansion of the metallic material of the longitudinal member will take place, while the fiber composite material contracts simultaneously. A good press-fit can be formed in this way.

For example, the connection segment can be cast on the crossmember. A good and durable connection is thus established between the crossmember and the longitudinal member.

A provision can be made, for example, that plastic is injected around the crossmember and a longitudinal member in the region of the connection point at least in sections. A cast hub of plastic is created over this which connects the crossmember to the longitudinal member(s) and establishes a good and durable connection between the crossmember and the longitudinal members. Such a connection can be embodied both as a form-fitting and force-fitting connection and is therefore stable and easy and cost-effective to manufacture.

It is also possible the laminate the connection segment into the crossmember. The connection segment can thus be integrated well into the crossmember, it thus being possible to already consider an advantageous load distribution during the manufacture of the crossmember. It is conceivable for the connection point contact to be embodied so as to be corrosion-reducing or contact corrosion-inhibiting. In this way, the connection segment of the predominantly metallic material-containing longitudinal member can be protected from corrosion during contact with the fiber composite material, which extends the service life of the connection segment and thus improves the durable connection between the crossmember and the longitudinal members.

It is conceivable for the crossmember to have a closed profile in cross section. In this way, direct and strong coupling can occur between the longitudinal members via the crossmember.

For example, the crossmember can have an open profile in cross section, particularly a U-profile. Open profiles offer an advantageous force progression, so that the forces and moments transferred at the connection point between crossmember and longitudinal member are distributed advantageously over a majority of the crossmember.

In one embodiment, the crossmember can have a constant or approximately constant cross section or a constant or approximately constant thickness over its entire length. In this way, the crossmember can be easily manufactured, and the connection points between the crossmember and the longitudinal members as well as the connection segments of the longitudinal members can also have a simple shape. A large contact surface can thus be created between the connection segment and the crossmember with little structural complexity. It is conceivable for the crossmember to have regions with different cross sections or wall thicknesses over its entire length. For instance, the crossmember can be reinforced in regions in which greater forces occur and be provided with a thinner cross section in regions in which lesser forces occur. In this way, the crossmember can be adapted well to various local loads, for example in different vehicles, thus enabling weight reduction.

It is possible for the longitudinal members to have a connection point to the body that is separate from the connection point to the crossmember. The crossmember can thus be structured on the body independently of additional bearing forces.

It is conceivable for the crossmember to be embodied integrally and to be approximately rectilinear over its entire length along an axis of symmetry. The crossmember can thus distribute inputted forces and moments in an especially advantageous manner. What is more, an integral design renders the crossmember more stable and break-resistant.

Possible embodiments of the invention are explained with the aid of the drawings.

Figure 1:
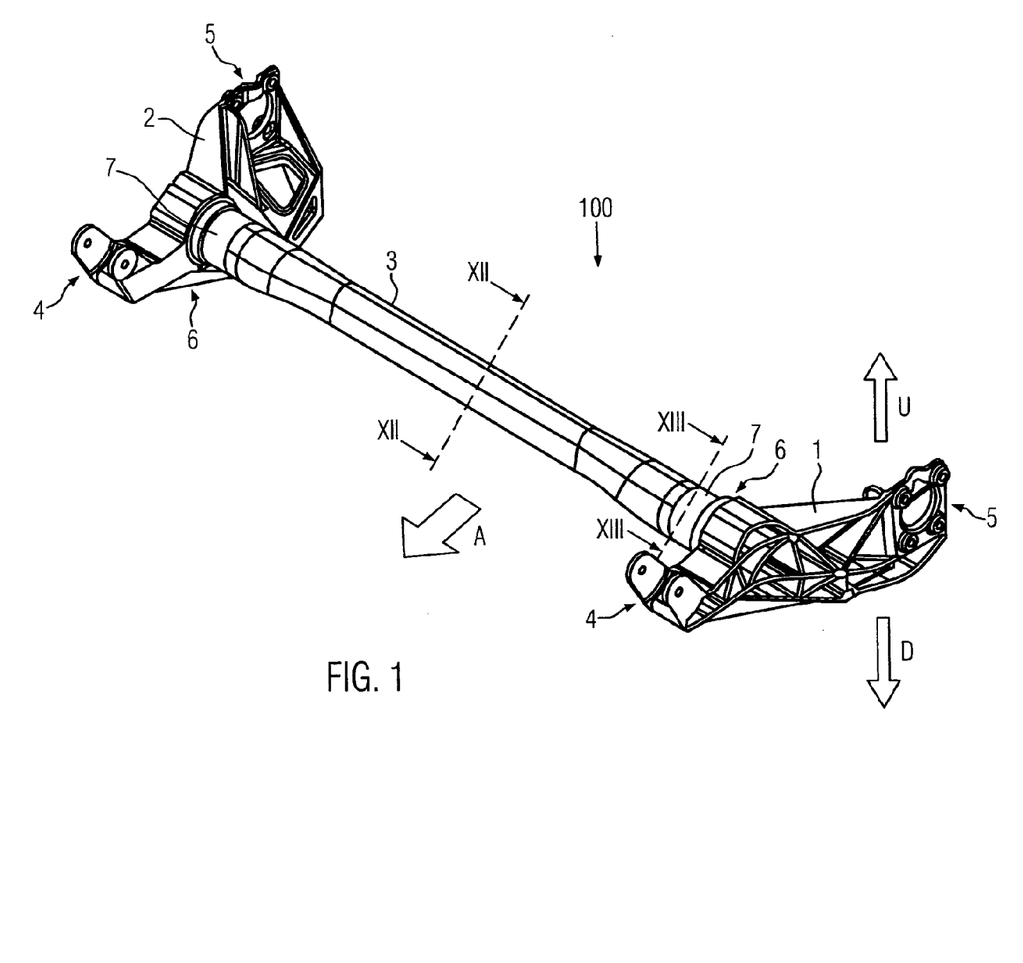
FIG. 1 shows an assembly according to the invention using the example of a twist beam axle in a perspective representation.

FIG. 1 shows an assembly 100 according to the invention for a vehicle using the example of a twist beam axle. The depicted twist beam axle is a rear axle of a vehicle. It is also conceivable, however, for the assembly according to the invention to be a front axis of a vehicle.

However, the invention is not limited to twist beam axles. According to the claims, it includes all assemblies for a vehicle having at least two longitudinal members and at least one crossmember arranged therebetween, as well as the rest of the features of the independent claim. These also include, for example, carriers, stabilizers, ladder frames, and the like.

The arrow A shown in FIG. 1 indicates the direction of motion of the vehicle. Accordingly, a longitudinal member 1 arranged on the left side of the vehicle in the direction of motion A as well as a longitudinal member 2 arranged on the right side of the vehicle in the direction of motion A are shown. A crossmember 3 is arranged between the two longitudinal members 1, 2 that runs approximately obliquely or transversely to the longitudinal members 1, 2.

The two longitudinal members 1, 2 each have a connection point 4 to the body at their front ends in the direction of motion. With this connection point 4, the assembly is supported in a swinging manner on the vehicle. Both longitudinal members 1, 2 also possess, at their end lying at the rear in the direction of motion, a connection point 5 for the wheels (not shown here) or for a suspension arm (not shown here) bearing the wheels. During the compression and rebounding of the vehicle, the longitudinal members 1, 2 are deflected upward along the vertical axis of the vehicle in the arrow direction U and downward in the arrow direction D around the support 4. When the left and right longitudinal members 1, 2 are deflected about equally, the crossmember 3 swings along without any torsional force acting on it for the most part.

However, if the two longitudinal members 1, 2 are deflected to different degrees or in different directions relative to each other, a moment that torsions the crossmember 3 is transferred into the crossmember 3 at its connection points 6 to the longitudinal members 1, 2. The crossmember 3 is thus a torsion member. Besides an elastic torsional deformation, elastic bending deformations also occur on the crossmember 3.

The crossmember 3 couples the two longitudinal members 1, 2 with each other. The reaction forces occurring during torsioning of the crossmember 3 are transferred via the connection points 6 between the crossmember 3 and the longitudinal members 1, 2 to the longitudinal members 1, 2. Via the lever embodied between one of the connection points 6 and one of the pivot points 5, a torque is exerted on the longitudinal member 1, 2 that counteracts the moments caused by the deflection U, D of the longitudinal member 1, 2 at least in part.

The crossmember 3 is made predominantly of fiber composite material. It can consist, for example, of carbon, glass fiber, aramid, kevlar, basalt, or other fiber composite materials. It is also conceivable for the crossmember 3 to consist of a mixture of different fiber composite materials. The matrix material can be thermosetting or thermoplastic, for example.

It is also conceivable for the crossmember 3 to be reinforced. For instance, the crossmember 3 can have a core, which can be a thin-walled metal pipe, for example, around which the fibers of the composite material are arranged. However, the fiber composite of the crossmember 3 can also contain fibers that reinforce the composite, such as metallic fibers, for example, as a component, or wires can be worked into the fiber composite laminate for reinforcement. Such a fiber composite reinforcement can generally be in the form of individual fibers, fiber bundles, wovens, warp-knits, weft-knits, or the like. The reinforcement materials can be worked in as a single layer or as multiple layers and be arranged or aligned unidirectionally or at an angle to the longitudinal axis of the crossmember 3. Other forms of reinforcement of the fiber composite of the crossmember 3 are also conceivable, however. Since the crossmember 3 is composed predominantly of fiber composite material, it can be conceivable for the crossmember 3 to also have a content of materials other than a fiber composite material of less than 50%. For instance, the transverse link 3 can be embodied as a fiber composite metal hybrid component.

The longitudinal members 1, 2 are made predominantly of a metallic material. In automotive engineering, they are usually deep-drawn or cast parts of body panel or aluminum. Since the longitudinal members are made predominantly of a metallic material, it is conceivable for the longitudinal members 1, 2 to have a content of material other than a metallic material of less than 50%.

The crossmember 3 is connected to the longitudinal members 1, 2 at the connection points 6. The crossmember 3 is braced or supported with its respective ends 7 on one of the two longitudinal members 1, 2 at its connection point 6 to the longitudinal members 1, 2.

The forces and moments mentioned at the outset acting between the longitudinal members 1, 2 and the crossmember 3 are particularly transferred at the connection point 6 between the longitudinal members 1, 2 and the crossmember 3. Torsional forces occurring predominantly as a result of the deflection U, D of the longitudinal member 4 are transferred via the connection point 6 to the crossmember 3. The connection point 6 between the crossmember 3 and the longitudinal members 1, 2 must therefore have a stable design.

Moreover, the connection point 6 must be capable of transferring to the crossmember 3 the moment inputted into the crossmember 3 and the forces inputted into the crossmember 3 in a manner that is as loss-free and uniform as possible, i.e., in such a way as to prevent stress peaks to the greatest possible extent.

The invention makes a provision in this regard that the connection point 6 between the crossmember 3 and the longitudinal member 1, 2 comprises a mutually overlapping region B. For this purpose, the longitudinal member 1, 2 has a connection segment 8. This connection segment 8 overlaps with a portion of the crossmember 3 at least in sections.

Figure 2:
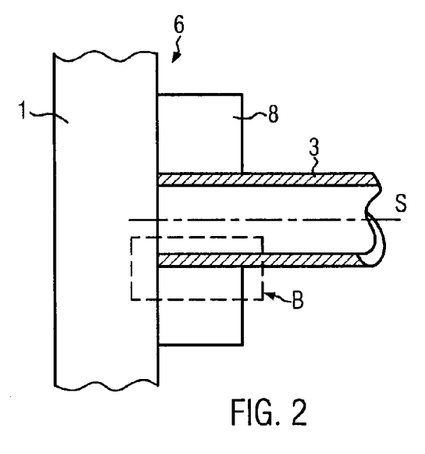
FIG. 2 shows an enlarged section of a connection point between a crossmember and a longitudinal member of an assembly according to the invention with a connection segment arranged on the outside on the crossmember.
Figure 3:
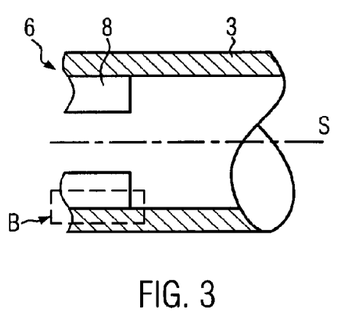
FIG. 3 shows an enlarged section of a connection point between a crossmember and a longitudinal member of an assembly according to the invention with a connection segment arranged on the inside on the crossmember.

Such a connection segment 8 is shown, inter alia, in FIGS. 2 and 3. FIG. 2 shows a cutout of a connection point 6 between a longitudinal member 1 and a crossmember 3. A connection segment 8 is arranged on the longitudinal member 1, or such a connection segment 8 extends from the longitudinal member 1.

The place at which the connection segment 8 overlaps with a section of the crossmember 3 is an overlap region B or an overlapping region B, which is shown in FIG. 2 within the box B depicted with broken lines. In FIG. 2, the crossmember 3 comes to rest against the connection segment 8 in the entire overlap region B. However, it is also conceivable for the connection segment 8 to rest against the crossmember 3 only partially or in sections. It is likewise conceivable for the connection segment 8 not to come to rest directly against the crossmember 3 in the overlap region B, in which case a hollow space or a clear gap exists between the crossmember 3 and the connection segment 8 that can be filled with adhesive, for example.

In the connection point 6 shown in FIG. 2, the connection segment 8 of the longitudinal member 1 is arranged in the overlap region B outside of the crossmember 3. A connection, shown here, can be established with a temperature-controlled joining method. It is expedient here for the connection segment 8 to be located at least partially outside of the crossmember 3. Upon heating of the connection segment 8 arranged on the longitudinal member 1, 2, the former expands due to the predominantly metallic material. In addition, the crossmember 3 can be heat-treated, in which case it contracts at the connection point 6 due to the predominantly fiber composite material. As shown in FIG. 2, the heated connection segment 8 is arranged outside of the crossmember 3. Upon cooling of the connection segment 8, it contracts again and is thus shrunk onto the crossmember. This connection can also be combined with other connections, such as form-fitting, force-fitting or integral connections, for example. Another embodiment of the connection point 6 is shown in FIG. 3 in which the connection segment 8 of the longitudinal member 1 (not shown here in further detail) is arranged in the overlap region B within the crossmember 3. An adhesive connection is particularly expedient in this case for mounting the crossmember 3 on the longitudinal member 1, 2.

Figure 9:
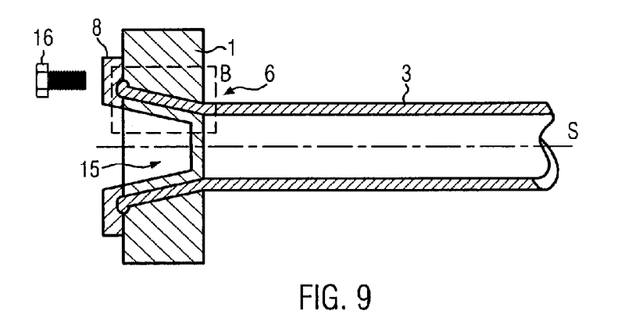
FIG. 9 shows another embodiment of a connection point between a crossmember and a longitudinal member of an assembly according to the invention with connection segments arranged both on the inside and on the outside on the crossmember.
Figure 10A:
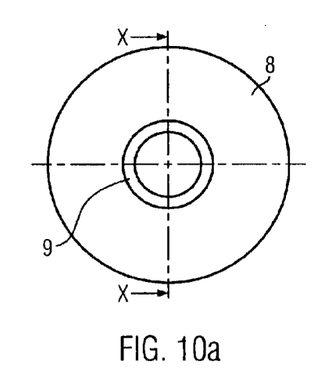
FIG. 10a shows another embodiment of a connection point between a crossmember and a longitudinal member of an assembly according to the invention with connection segments arranged both on the inside and on the outside on the crossmember.
Figure 10B:
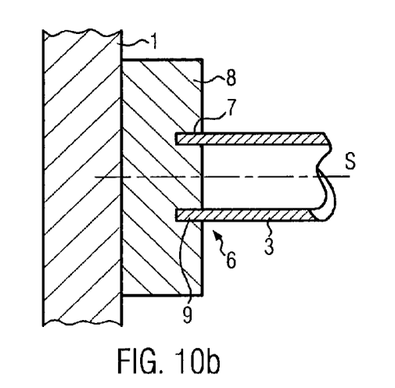
FIG. 10b shows a cross-sectional view of the connection point illustrated in FIG. 10a along the sectional line X-X.

It is also conceivable for the connection segment 8 of the longitudinal member 1 to be arranged in the overlap region B both partially within and partially outside of the crossmember 3 (see also FIGS. 9 and 10). One conceivable construction of the connection segment 8 would be a circumferential groove 9, for example, that is introduced into the connection segment 8 and into which an end 7 of a crossmember 3 can be introduced (see FIGS. 10a and 10b). Incidentally, all statements made above and in the following regarding the longitudinal member 1 also apply to the longitudinal member 2, which can also have a connection segment 8.

The connection segment 8 can be a component that is integrally formed with the longitudinal member 1, 2. For example, the connection segment 8 can be deep-drawn from the longitudinal member 1, 2 during the manufacture thereof or be cast on same.

However, the connection segment 8 can also be a component that can be connected separately to the longitudinal member 1, 2. Thus, it is conceivable for the connection segment 8, after being manufactured, to be screwed, adhered, welded, cast or otherwise connected to the longitudinal member 1, 2, for example. In general, the connection point 6 according to the invention can have at least one form-fitting and/or force-fitting and/or integral connection between the crossmember 3 and the longitudinal member 1, 2. Such connections are described below in further detail with reference to FIGS. 4 to 10.

Figure 4:
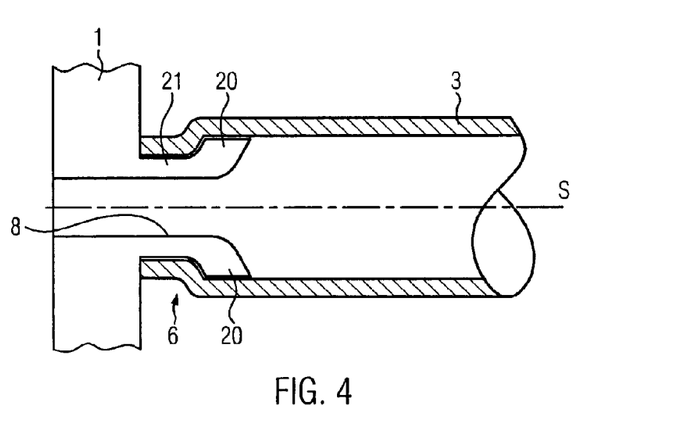
FIG. 4 shows an enlarged section of another connection point between a crossmember and a longitudinal member of an assembly according to the invention with a connection segment arranged on the inside on the crossmember.

For instance, FIG. 4 shows a force- and form-fitting connection between the connection segment 8 of the longitudinal member 1 and the crossmember 3 at the connection point 6. The connection segment 8 has an undercut 20 on its crossmember-side end. At its longitudinal member-side end, the crossmember 3 has a narrowing 21. The inner side thereof comes to rest against a commensurately shaped outer side of the connection segment 8. The connection segment 8 thus engages behind the narrowed part of the crossmember 3 and is thus connected thereto in a force-fitting and form-fitting manner.

Figure 5:
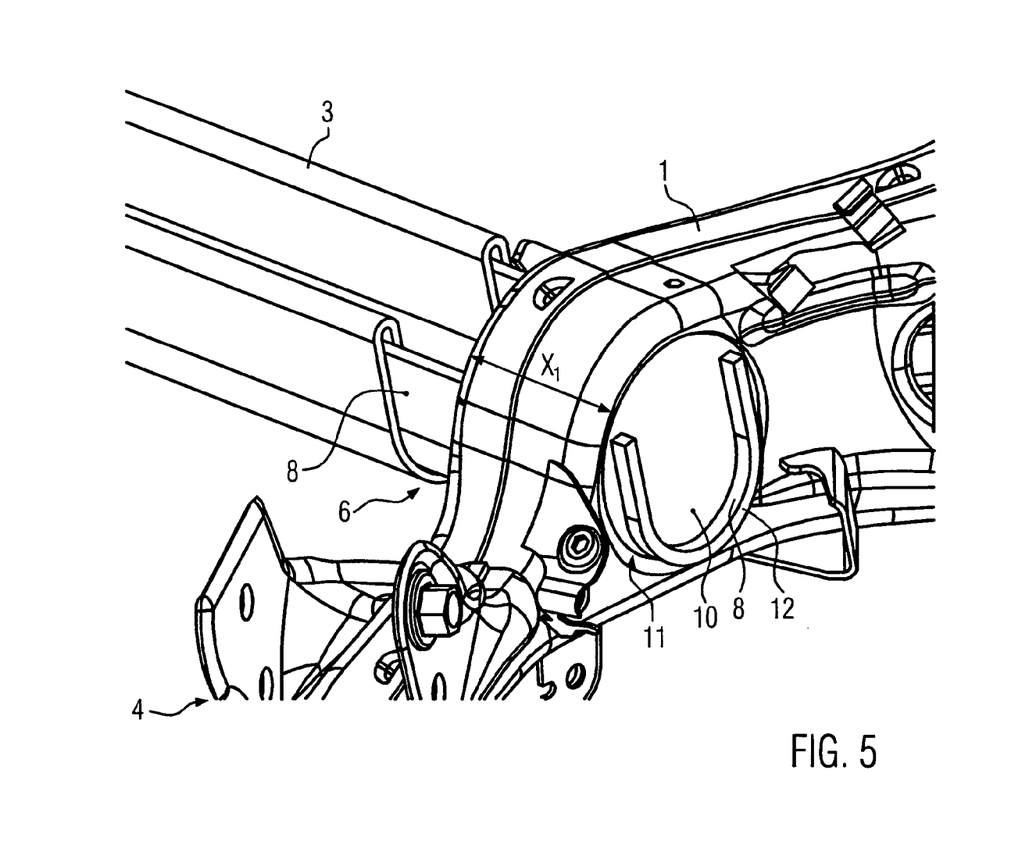
FIG. 5 shows another embodiment of a connection point between a crossmember and a longitudinal member of an assembly according to the invention.

FIG. 5 shows a form-fitting connection between the crossmember 3 and the longitudinal member 1. Here, the crossmember 3 has a double-walled U-profile into whose interior space a likewise U-shaped connection segment 8 extends. It is conceivable for the connection segment 8 to be laminated into the crossmember 3 in the overlap region B with at least one layer of the fiber composite material.

The connection segment 8 is connected to the longitudinal member 1 with its end arranged opposite the crossmember 3. In the present case, the connection segment 8 is arranged in a support 10. The support 10 can be a bearing bush or a full pipe in which the connection segment 8 is mounted, for example cast in.

This bearing bush 10 can be introduced, for example pressed, into the recess 11 provided in the longitudinal member 1. By virtue of this press-fit, additional damping can be achieved.

The connection segment 8 can also be connected firmly or rigidly to the longitudinal member 1. As shown in FIG. 5, the connection segment 8 need not extend over the entire width XI of the longitudinal member 1 and beyond, so that the end 12 of the connection segment 8 arranged opposite the transverse link 3 protrudes out of the opposite side of the longitudinal member 1. It would be conceivable for the end 12 of the connection segment 8 to be arranged within the longitudinal member 1 along the width XI or to be arranged on a side of the longitudinal member 1 facing toward the transverse link 3.

The form-fitting connection depicted in FIG. 5 can also be combined with other connections, such as force-fitting, form-fitting or integral connections.

Figure 6:
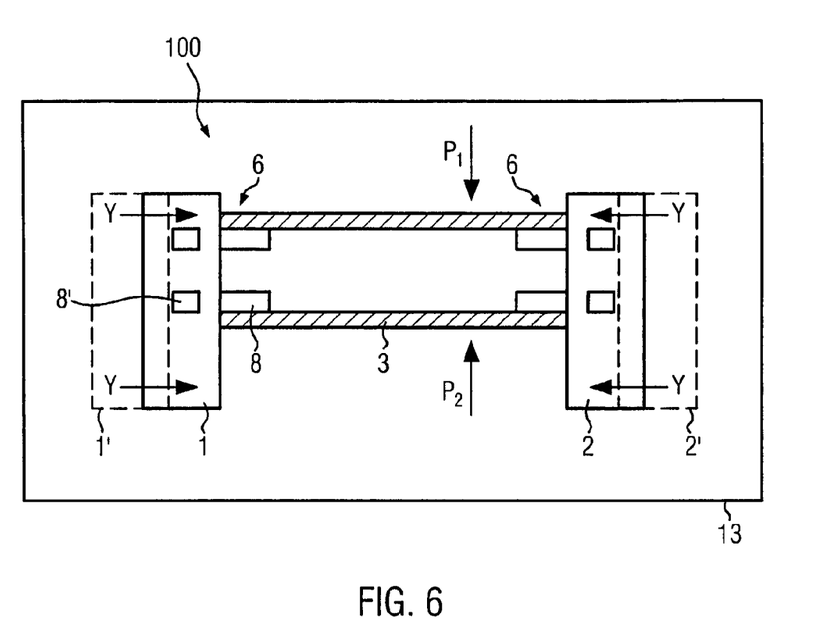
FIG. 6 shows another embodiment of a connection point between a crossmember and two longitudinal members of an assembly according to the invention in a forming tool.

FIG. 6 shows another embodiment of a connection point 6 between the crossmember 3 and the longitudinal members 1, 2. It is conceivable here for the longitudinal members 1, 2 to be brought laterally against the crossmember 3 and for the connection segments 8 of the longitudinal members 1, 2 to be inserted into the crossmember 3. It is also conceivable for connection segments 8 to be provided either additionally outside of the crossmember 3 or both inside and outside of the crossmember 3.

FIG. 6 shows, with broken lines, a first initial position of the longitudinal member 1' and of the longitudinal member 2' in which the connection segments 8' do not yet overlap with the crossmember 3. The longitudinal members 1', 2' are brought close to the crossmember 3 along the arrow direction Y, thus forming a connection point 6 between the crossmember 3 and the longitudinal members 1, 2.

It is possible for a press-fit to occur here, in which case the crossmember 3 is pressed onto the connection segments 8. However, a thermal joining method as described previously with reference to FIG. 2 can also be used. Such a thermal joining method can be carried out in a forming tool 13 in which the assembly 100 is located. Moreover, it is conceivable for a pressure to be applied in the region of the connection points 6, particularly in the arrow direction Pi or P2, to the assembly 100 before, during or after the thermal joining method.

It is also conceivable in the embodiment depicted in FIG. 6 for a connection to be established between the crossmember 3 and the longitudinal members 1, 2 through resin injection. A combination of form-fitting and force-fitting connections is thus formed between crossmember 3 and longitudinal member 1, 2, similarly to the injection-coating of components, or also comparably to the resin transfer molding (RTM) method.

The connection point 6 described with reference to FIG. 6 can also be embodied in combination with other connections, such as form-fitting, force-fitting or integral connections.

Figure 7:
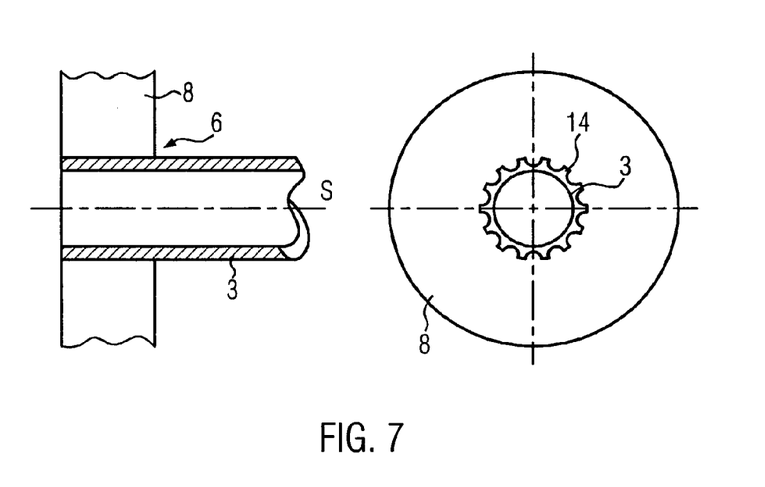
FIG. 7 shows another embodiment of a connection point between a crossmember and a longitudinal member of an assembly according to the invention with a connection segment arranged on the outside on the crossmember.

FIG. 7 shows another embodiment of a connection point 6. Here, the connection segment 8 of the longitudinal member 1, 2 is cast against the crossmember 3. A provision can be made that the connection segment 8 or the transverse link 3 has form-fitting elements, such as circumferential toothing 14, for example. One tooth or one projection can also be sufficient. In FIG. 7, the crossmember 3 has teeth and the connection segment 8 has fitting recesses into which the teeth engage. However, it is irrelevant whether the crossmember 3 has a tooth or a recess, as long as the corresponding counterpart is formed on the connection segment 8.

Moreover, a coating or coat can be provided on the crossmember 3 at least in the region of the connection point 6 or in the region of the overlap region B that protects the fiber composite material of the crossmember 3 from the effect of excessive heat during casting of the connection segment 8.

Figure 8A:
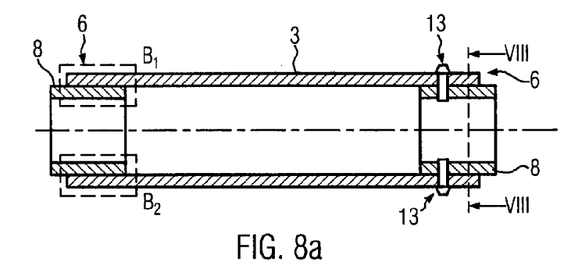
FIG. 8a shows another embodiment of a connection point between a crossmember and a longitudinal member of an assembly according to the invention with connection segments arranged on the inside on the crossmember.
Figure 8B:
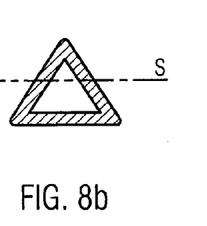
FIG. 8b shows a cross-sectional view of a connection segment illustrated in FIG. 8a along a sectional line VIII-VIII.

The connection shown in FIG. 7 can also be embodied in connection with other connections, for example form-fitting, force-fitting or integral connections. FIGS. 8a and 8b show additional inventive embodiments of connection segments 6 between the crossmember 3 and the longitudinal members 1, 2. For instance, the connection segment 8 can be fastened to the crossmember 3 with screws 13 or rivets 13. However, the connection segment 8 can also be adhered to the crossmember in the overlap regions BT and B2. A combination of adhesion and mechanical connection is also conceivable.

In the view shown in FIG. 8a, it can be seen that a large overlap region $B_1$ or $B_2$ forms a large contact surface or bearing surface between the crossmember 3 and the connection segment 8. The larger the overlap region B is, the more uniformly the forces or moments occurring at the connection points 6 can be transferred to the crossmember 3 and the more connecting elements can be provided.

As also shown in FIG. 8b, it is conceivable for there to be at least one geometric form-fit between the crossmember 3 and the longitudinal members 1, 2 at the connection point 6. This can be achieved, for example, by embodying the side of the crossmember 3 resting against the connection segment 8 with the same geometric shape at least in the overlap region B as the side of the connection segment 8 resting against the crossmember 3. This shape can be triangular, for example, as shown in FIG. 8b. Other shapes that can provide a geometric form-fit are also conceivable. FIG. 9 shows another embodiment of a connection point 6. Here, a preferably conical bore 15 is located in the longitudinal member 1, 2 or in the connection segment 8. The crossmember 3 can be inserted into this bore 15.

A connection segment 8 overlaps in the overlap region B at least in sections on the inside and outside with a part of the crossmember 3. Moreover, the connection segment 8 can be attached on the inside and/or, as shown in FIG. 9, also on the outside to the longitudinal member 1, 2. The connection segment 8 can be attached to the longitudinal member 1, 2 with a screw 16, for example.

Figures 11A, 11B:
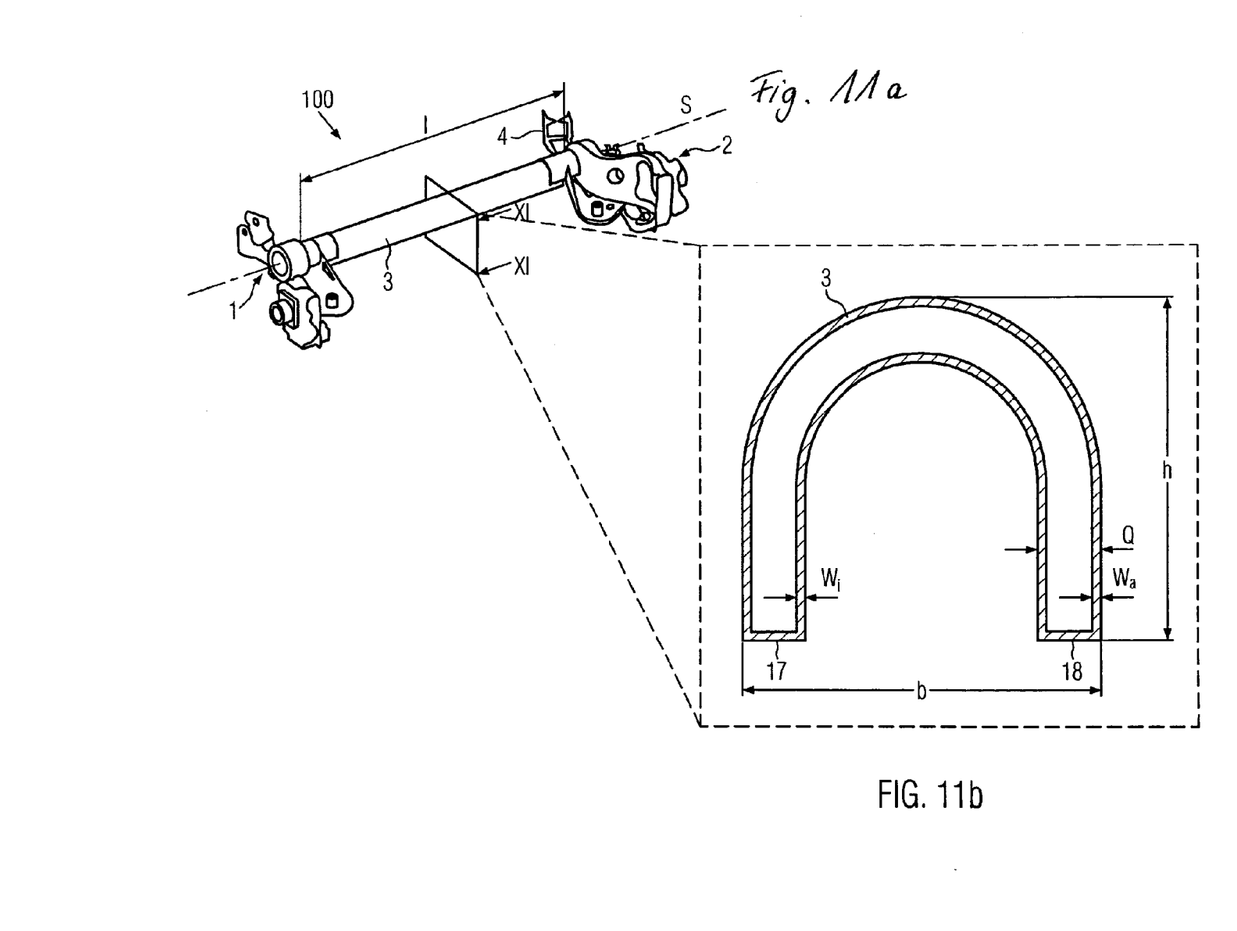
FIG. 11a shows an assembly according to the invention in a perspective representation with a crossmember having an open profile.
FIG. 11b shows a cross-sectional view of the crossmember illustrated in FIG. 11a along a sectional plane XI-XI, FIGS. 12.1 to 12.8 show cross-sectional views of different closed crossmember profiles along a sectional plane XII-XII drawn in FIG. 1, and FIGS. 13.1 to 13.7 show cross-sectional views of various open crossmember profiles along a sectional plane XIII-XIII drawn in FIG. 1.

FIG. 11a shows another embodiment of an assembly 100 according to the invention. The crossmember 3 has an overall length I.

FIG. 11b shows a sectional view along the sectional line XI-XI of the crossmember 3 from FIG. 11a. The crossmember 3 has a height h and a width b. The crossmember 3 also has an inner wall thickness $W_i$, as well as an outer wall thickness $W_a$. The crossmember 3 also has a cross section Q. The crossmember 3 depicted in FIG. 11b in a cross-sectional view has a profile that is open in cross section, namely a U-profile or a C-profile. In this case, the opening of the profile is directed toward the roadway. However, it can also be directed in any direction.

Moreover, a crossmember 3 of the assembly according to the invention can have a profile that is closed in cross section, i.e., without an opening. In that case, the open ends 17, 18 of the crossmember 3 shown here as a U-profile would be interconnected.

As can be seen in FIG. 11a, the crossmember 3 has an approximately constant cross section Q and an approximately constant wall thickness $W_i$, $W_a$ over its entire length I. In another embodiment (not shown here), the crossmember 3 has regions with different cross sections Q or wall thicknesses $W_i$, $W_a$ over its entire length I. Regions of the crossmember 3 bearing heavier loads has a greater cross section Q and/or greater wall thicknesses $W_i$, $W_a$. Regions of the crossmember 3 bearing lighter loads can have thinner cross sections Q and/or wall thicknesses $W_i$, $W_a$.

FIG. 11a, like FIG. 1, shows a connection point 4 to the body at the longitudinal members 1, 2. The longitudinal members 1, 2 and thus the entire assembly 100 is supported in a swinging manner on the body of the vehicle via this connection point 4. It is advantageous to provide this connection point 4 or support 4 separately from the connection point 6 on the longitudinal members 1, 2, since the crossmember 3 is thus not loaded directly with the bearing forces.

In the previously described FIGS. 1 to 11, the crossmember 3 is embodied as a single part. It is also conceivable, however, for the crossmember 3 to be composed of several parts, provided that it is manufactured according to the claims predominantly of fiber composite material.

Moreover, in FIGS. 1 to 11, the crossmember 3 of the assembly according to the invention depicted in FIGS. 1 to 11 is approximately rectilinear along an axis of symmetry S over its entire length I. It is also conceivable, however, for the shape of the crossmember to be adapted to the designed space dictated by the underbody structure of the vehicle—angled, for example.

According to the present invention, the crossmember 3 is braced or supported at its connection points 6 to the longitudinal members 1, 2 with its respective ends 7 to one of the two longitudinal members 1, 2, with torsional forces being transferred to the crossmember 3 particularly at this connection point 6.

The connection points 6 of the assembly according to the invention 100 have the general advantage that the forces and moments occurring during a deflection movement U, D of the longitudinal member 1, 2 are transferred to the torsion member 3 in a manner that is as loss-free as possible. The connection point 6 of the assembly according to the invention thus does not significantly determine the torque, the roll rate or the measure of torsion or the bending moment acting on the crossmember 3.

Moreover, according to one embodiment, the connection point 6 of the assembly according to the invention 100 can be contact corrosion-reducing and/or contact corrosion-inhibiting. This can be achieved, for example, by applying corrosion-reducing coatings or layers to the connection segment 8 and/or the crossmember 3 at least in the overlap region B. However, the connection point 6 can also be contact corrosion-reducing and/or contact corrosion-inhibiting by virtue of being made of non-rusting stainless steel, aluminum or the like.

FIGS. 12.1 to 12.8 show various closed cross sectional profiles of a crossmember 3 along a sectional plane XII-XII drawn in FIG. 1. These cross sectional profile view of a crossmember 3 are hereinafter referred to as "profile part." In the present application, a closed profile is understood as being a profile that completely encloses a hollow space and thus does not have any open ends.

FIG. 12.1 shows a profile part 121 with an approximately round shape in cross section, FIG. 12.2 shows a profile part 122 with an approximately elliptical shape in cross section, FIG. 12.3 shows a profile part 123 with an approximately rectangular or square shape in cross section, and FIG. 12.4 shows a profile part 124 with an approximately polygonal shape in cross section. Such shapes are simple and cost-effective to manufacture. Moreover, the shapes can be adapted appropriately to the respective loads, for example using an FEM (Finite Element Method) calculation.

Figure 125:
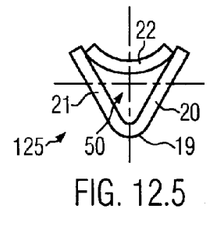

FIG. 12.5 shows an approximately V-shaped first profile part 19 in which a second profile part 22 is provided on the sides of the flanks 20, 21 facing each other. In the present example, the second profile part 22 has an approximately U-shape. The second profile part 22 borders on the inner sides of the flanks 20, 21 of the first profile part 19 and can be connected thereto. The first profile part 19 thus forms a closed profile part 125 with the second profile part 22.

Figure 121:
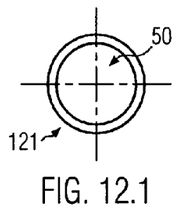
Figure 122:
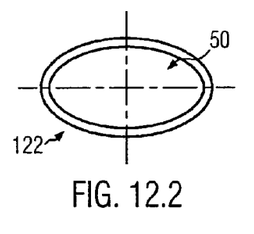
Figure 123:
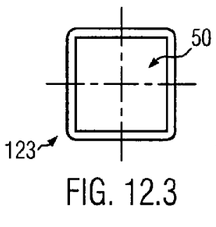
Figure 124:
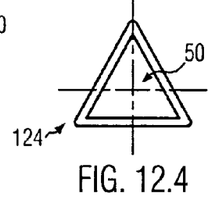
Figure 126:
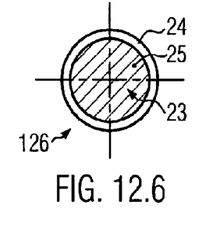

FIG. 12.6 shows another profile part 126 with an approximately round shape in cross section. While the profile part 121 depicted in FIG. 12.1 is hollow on the inside for the most part, the profile part 126 depicted in FIG. 12.6 has a core 25 that extends at least partially into the interior space 23. The core 25 is enclosed at least partially by the outer wall 24 of the crossmember 3.

The core 25 is made predominantly of fiber composite material, whereas the outer wall 24 is made predominantly of metallic material. It is also conceivable, however, for both the core 25 and the outer wall 24 to be made predominantly of fiber composite material. It is also conceivable, however, for both the core 25 and the outer wall 24 to be made predominantly of metallic material. It is also conceivable, however, for the core 25 to be made predominantly of metallic material and the outer wall 24 to be made predominantly of fiber composite material.

It is also conceivable for the profile parts 121, 122, 123, 124, 125 shown in FIGS. 12.1 to 12.5 to also have such a core and to also have material pairings with this core such as those described with reference to FIG. 12.6.

Figure 127:
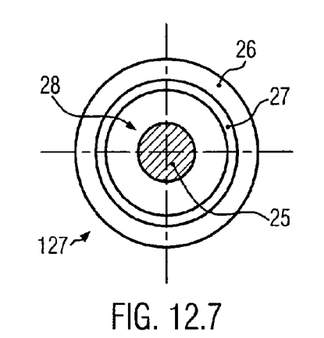

FIG. 12.7 shows a profile part 127 with an approximately round shape in cross section. The profile part 127 has a first wall layer 26 and a second wall layer 27. The second wall layer 27 is arranged at least partially within the first wall layer 26.

A hollow space 28 is embodied on the interior of the profile part 127. A core 25 is located within this hollow space 28. Unlike the profile part 126 depicted in FIG. 12.6, the core 25 in the profile part 127 depicted in FIG. 12.7 is not in contact with the wall layers 26, 27. It is conceivable for the hollow space 28 embodied between the core 25 and the wall layers 26, 27 to be filled with a material, for example a resin (not shown here).

The core 25 is made predominantly of fiber composite material, whereas the wall layers 26, 27 are made predominantly of metallic material. It is also conceivable, however, for both the core 25 and the wall layers 26, 27 to be made predominantly of fiber composite material. It is also conceivable, however, for both the core 25 and the wall layers 26, 27 to be made predominantly of metallic material. It is also conceivable, however, for the core 25 to be made predominantly of metallic material and the wall layers 26, 27 to be made predominantly of fiber composite material. Moreover, more than two wall layers can be provided, which also applies, incidentally, to all of the other profile parts 121 to 128 depicted in FIGS. 12.1 to 12.8.

Figure 128:
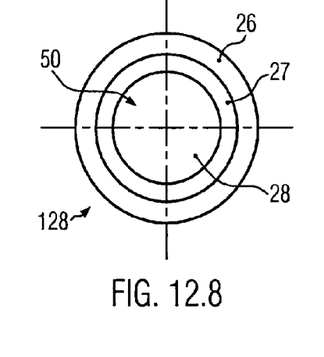

FIG. 12.8 shows a profile part 128 with an approximately round shape in cross section. The profile part 128 differs from the profile part 127 depicted in FIG. 12.7 in that no core is arranged in the hollow space 28.

FIGS. 13.1 to 13.7 show various open cross-sectional profiles of a crossmember 3 along a sectional plane XIII-XIII drawn in FIG. 1. These cross-sectional profile views of a crossmember 3 are hereinafter referred to as "profile part." In the present application, an open profile is understood as being a profile that encloses a hollow space while having an opening and two open ends.

Figure 131:
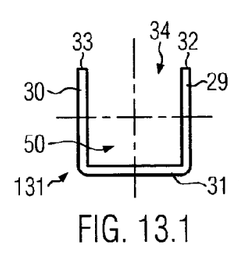

FIG. 13.1 shows an approximately U-shaped profile part 131. The profile part 131 has two flanks 29, 30 that are interconnected via a connection part 30. The profile part 131 has two open ends 32, 33. These define an opening 34 of the profile part 131. The opening 34 points upward here, i.e., along the vertical axis of the vehicle away from the roadway. The opening 34 can also point downward, however, i.e., along the vertical axis of the vehicle toward the roadway. The opening 34 can also point forward or backward along the direction of motion. Incidentally, the alignment of the opening also applies to all other depicted profile parts 132, 133, 134, 135, 136, 137.

Figure 132:
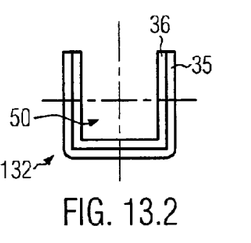

The profile part 132 shown in FIG. 13.2 differs from the profile part 132 shown in FIG. 13.1 in that the profile part 132 has several—in the present FIG. 13.2, two—wall layers 35, 36. The profile part 132 can also have more than two wall layers. Depending on the requirement, the profile part can preferably have three or four wall layers. At least one wall layer is made predominantly of fiber composite material. Another layer can be made predominantly of metallic material. Such a multilayer structure can also be provided in the other open profile parts 131, 133, 134, 135, 136, 137.

Figure 133:
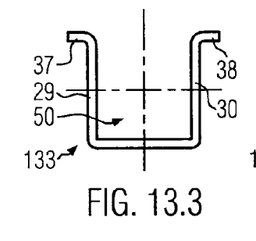
Figure 134:
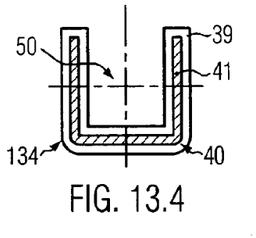

FIG. 13.3 shows a profile part 133 with two flanges 37, 38 that extend at the open ends of the approximately U-shaped profile part 133. The flanges 37, 38 are formed integrally with the flanks 29, 30 of the profile part 133. However, the flanges 37, 38 can also be mounted as separate components at the open ends of the flanks 29, 30, for example through adhesion or welding. Moreover, the flanges 37, 38 can be made predominantly of metallic material, whereas the profile part 133 consists predominantly of fiber composite material. However, the flanges 37, 38 can also be made predominantly of fiber composite material, whereas the profile part 133 consists predominantly of metallic material. It is also conceivable for both the flange 37, 38 and the profile part 133 to be made predominantly of metallic material or to be made predominantly of fiber composite material. FIG. 13.4 shows a profile part 134 having a wall 39. A hollow space 40 is located within this wall. In the profile part 134 depicted in FIG. 13.4, this hollow space 40 is filled at least in sections with a core 41. The wall 39 consists predominantly of fiber composite material, whereas the core 41 is made predominantly of metallic material. It is also conceivable for the core 41 to be made predominantly of fiber composite material and for the wall 39 to be made predominantly of metallic material. It is also conceivable, however, for both the wall 39 and the core 41 to be made predominantly of fiber composite material or to be made predominantly of metallic material.

Figure 135:
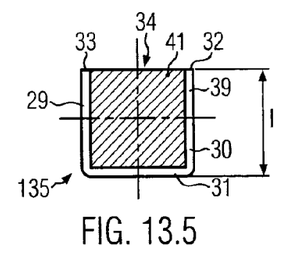

FIG. 13.5 shows another profile part 135 with a wall 39 and a core 41. The core 41 is provided in the interior space, i.e., on the sides of the flanks 29, 30 facing toward each other. The core 41 rests at least in sections against the inner sides of the flanks 29, 30 or against the inner side of the connection part 31. The core 41 extends from the connection part 31 toward the opening 34. The core 41 extends completely from the connection part 31 to the open ends 32, 33; that is, the core 41 extends approximately over the entire length I of the flanks 29, 30. However, the core 41 can also extend over approximately three-fourths, or preferably over approximately half, or advantageously over approximately one-fourth of the length I of the flanks 29, 30. The wall 39 is made predominantly of fiber composite material, whereas the core 41 is made predominantly of metallic material. It is also conceivable, however, for the core 41 to be made predominantly of fiber composite material and the wall 39 to be made predominantly of metallic material. It is also conceivable for both the wall 39 and the core 41 to be made predominantly of fiber composite material or to be made predominantly of metallic material.

Figure 136:
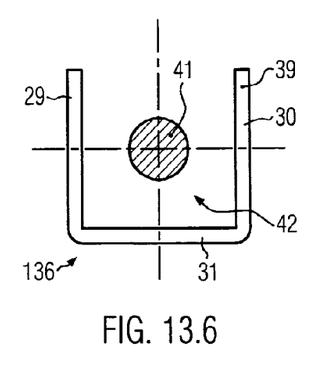

FIG. 13.6 shows another profile part 136 with a wall 39 and a core 41. The profile part 136 differs from the profile part 135 shown in FIG. 13.5 in that the core 41 does not rest against the inner sides of the flanks 29, 30 or against the inner side of the connection part 31. The core 41 is located in a hollow space 42 or cavity 42 formed by the profile part 136. It is conceivable for this hollow space 42 to be filled, for example with a resin. The wall 39 is made predominantly of fiber composite material, whereas the core 41 is made predominantly of metallic material. It is also conceivable, however, for the core 41 to be made predominantly of fiber composite material and the wall 39 to be made predominantly of metallic material. It is also conceivable for both the wall 39 and the core 41 to be made predominantly of fiber composite material or to be made predominantly of metallic material.

Figure 137:
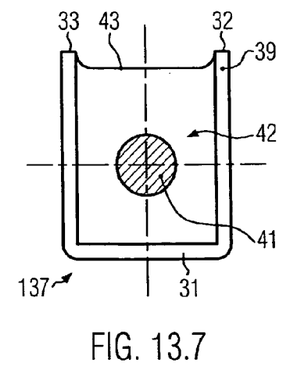

FIG. 13.7 shows a profile part 137 that differs from the profile part 36 shown in FIG. 13.6 in that at least one stiffening rib 43 is provided approximately in the region of the open ends 32, 33. The stiffening ribs 43 extend between the two open ends 32, 33. The stiffening ribs 43 protrude, as depicted in FIG. 13.7, at least in sections into a region of the hollow space 42. However, the stiffening ribs 43 can also protrude over the open ends 32, 33 in a direction opposite the connection part 31. The stiffening ribs 43 are made predominantly of fiber composite material. However, the stiffening ribs 43 can also be made predominantly of metallic material.

The cores 25, 41 disclosed with reference to FIGS. 12.6, 12.7, 13.4, 13.5, 13.6 and 13.7 can also be provided in the hollow space 50 of the profile parts 121, 122, 123, 124, 125, 131, 132, 133, 134 depicted in FIGS. 12.1, 12.2, 12.3, 12.4, 12.5, 13.1, 13.2, 13.3 and 13.4.

As regards the cores 25, 41, it is especially advantageous if the core 25, 41, as depicted in FIGS. 12.6, 12.7, 13.6, 13.7, is a rod or a hollow pipe or full pipe that extends at least partially over the overall length I of the crossmember 3 depicted in FIG. 11a. In this way, the stiffness and/or the roll rate can be determined via the core 25, 41, that is, the core 25, 41 is loaded primarily in a torsional manner. The wall of the crossmember 3 can be dimensioned independently thereof; that is, the wall of the crossmember 3 is loaded primarily not in a torsional manner, but in a bending manner. The stiffening ribs 43 depicted in FIG. 13.7 are advantageously used here to increase the stiffness of the crossmember 3. In this rod or pipe arrangement of an additional core 25, 41, it is advantageous if this core 25, 41 is made predominantly of metallic material, whereas the wall of the crossmember 3 enclosing the core 25, 41 is made predominantly of fiber composite material.

The profiles depicted in FIGS. 12.1 to 12.8 can also be provided at the ends 7 of the crossmember 3, i.e., along the sectional line XIII-XIII. The profiles depicted in FIGS. 13.1 to 13.7 can also be provided approximately in the center of the crossmember 3, i.e., along the sectional line XII-XII.

All of the connection types of the connection points 6 explained in the description of the exemplary figures can also be combined with each other.

The invention claimed is:
1. An assembly for a vehicle, comprising:
two longitudinal members and a crossmember arranged therebetween that runs approximately transverse to the longitudinal members,
wherein the crossmember is an elastically torsionable torsion member,
the crossmember is made predominantly of fiber composite material and the longitudinal members are made predominantly of a metallic material,
the crossmember is connected to the longitudinal members at a connection point for transferring torsional forces between the longitudinal members and the crossmember, and
the connection point between the crossmember and the longitudinal member including a connection segment that is separate from and extends between the crossmember and a respective one of the longitudinal members to overlap with a part of the predominantly fiber composite material-containing crossmember and a part of the respective longitudinal member.
2. The assembly as set forth in claim 1, wherein the connection segment is arranged partially within the predominantly fiber composite material-containing crossmember.

3. The assembly as set forth in claim 2, wherein the crossmember has a double-walled profile to define an interior space, and the connection segment extends into the interior space.

4. The assembly as set forth in claim 3, wherein the double-walled profile of the crossmember is closed in cross section.

5. The assembly as set forth in claim 3, wherein the double-walled profile of the crossmember is open in cross section, particularly a double-walled U-profile, and the connection segment is a U-shaped connection segment.

6. The assembly as set forth in claim 1, wherein the connection segment is arranged partially within the respective longitudinal member.

7. The assembly as set forth in claim 6, wherein the connection segment is cast on the crossmember.

8. The assembly as set forth in claim 6, wherein the longitudinal member defines a recess and includes a support disposed in the recess, and the connection segment extends within the support.

9. The assembly as set forth in claim 8, wherein the support is a bearing bush.

10. The assembly as set forth in claim 8, wherein the connector segment is cast in the support.

11. The assembly as set forth in claim 9, wherein the bearing bush is press fit into the recess defined by the longitudinal member.

12. The assembly as set forth in claim 8, wherein an end of the connection segment protrudes out of the support.

13. The assembly as set forth in claim 1, wherein the connection point between the crossmember and the longitudinal member is a form-fitting and/or force-fitting and/or integral connection.

14. The assembly as set forth in claim 1, wherein the crossmember is connected by means of a temperature-controlled joining method to the connection segment.

15. The assembly as set forth in claim 1, wherein the connection segment is laminated into the crossmember.

16. The assembly as set forth in claim 1, wherein the connection segment is contact corrosion-reducing and/or contact corrosion-inhibiting.

17. The assembly as set forth in claim 1, wherein the crossmember has an approximately constant cross section (Q) and/or an approximately constant wall thickness ($W_i$, $W_a$) over its entire length (I).

18. The assembly as set forth in claim 1, wherein the crossmember has regions with different cross sections (Q) and/or wall thicknesses ($W_i$, $W_a$) over its entire length (I).

19. The assembly as set forth in claim 1, wherein the longitudinal members have a connection point to the body that is separate from the connection point to the crossmember.

20. The assembly as set forth in claim 1, wherein the crossmember is embodied in a single part and approximately rectilinear over its entire length (I) along an axis of symmetry (S).

* * * * *